United States Patent [19]

Ahvenainen

[11] Patent Number: 6,091,946
[45] Date of Patent: Jul. 18, 2000

[54] CHECKING THE ACCESS RIGHT OF A SUBSCRIBER EQUIPMENT

[75] Inventor: Jouko Ahvenainen, Helsinki, Finland

[73] Assignee: Nokia Telecommunications OY, Espoo, Finland

[21] Appl. No.: 08/875,023

[22] PCT Filed: May 10, 1996

[86] PCT No.: PCT/FI96/00266

§ 371 Date: Jun. 20, 1997

§ 102(e) Date: Jun. 20, 1997

[87] PCT Pub. No.: WO96/36194

PCT Pub. Date: Nov. 14, 1996

[30] Foreign Application Priority Data

May 12, 1995 [FI] Finland .................................. 952339

[51] Int. Cl.[7] ................................................. H04K 1/00
[52] U.S. Cl. ..................... 455/411; 455/422; 455/433; 455/435; 380/23
[58] Field of Search ................................. 455/410, 411, 455/406, 408, 422, 433, 435, 67.1, 528, 561; 380/23

[56] References Cited

U.S. PATENT DOCUMENTS

| | | | |
|---|---|---|---|
| 5,537,474 | 7/1996 | Brown et al. | 455/411 |
| 5,748,720 | 5/1998 | Loder | 455/407 |
| 5,839,063 | 11/1998 | Lee | 455/410 |
| 5,854,976 | 12/1998 | Garcia Aguilera et al. | 455/411 |

FOREIGN PATENT DOCUMENTS

| | | |
|---|---|---|
| 448 369 | 9/1991 | European Pat. Off. . |
| 607 767 | 7/1994 | European Pat. Off. . |
| 2 248 999 | 4/1992 | United Kingdom . |
| 95/01695 | 1/1995 | WIPO . |

OTHER PUBLICATIONS

European Telecommunication Standard, Final Draft pr ETS300 509, May 1994 European digital cellular telecommunications system (phase 2); subscriber identity modules (SIM) functional characteristics 9GSM 02.17) p. 3–15.

European Telecommunication Standard, Final Draft pr ETS 300 608, Nov. 1994European Digital Cellular Telecommunications System (Phase 2); Specification of the Substriber Identity Module–Mobile Equipment (SIM–ME) Interface 9GSM 11.11) pp. 4–93.

The GSM System, Network Management. The Traffic within the Network can be minimised by storing in the visited MSC/VLR the IMEI of the equipmentt in use with a given SIM, in order to interrogate the IIR less often, pp. 588–591, Michel Mouly et al.

*Primary Examiner*—Doris H. To
*Attorney, Agent, or Firm*—Pillsbury Madison & Sutro LLP

[57] ABSTRACT

A method for checking the access right of a subscriber equipment in a mobile communication system in which a mobile equipment is registered in a network infrastructure by transmitting the identity of the subscriber from the mobile equipment to the network infrastructure includes transmission of the subscriber equipment identity of the mobile equipment to the network infrastructure, checking the subscriber data of the subscriber in the database of the mobile communication system, and compares the equipment identity of the subscriber, which is stored in the database, to the equipment identity transmitted by the mobile equipment. If the equipment identities are the same, the mobile equipment is allowed to continue operating normally, and if the equipment identities differ, the access right of the mobile equipment will be checked in the equipment identity register of the network infrastructure.

9 Claims, 2 Drawing Sheets

CHECKING THE ACCESS RIGHT OF A SUBSCRIBER EQUIPMENT

Field of the Invention

The present invention relates to a radio system in which subscribers and terminals are not permanently connected, and more particularly, to terminal equipment and subscriber identity modules, for example, SIM cards (SIM=Subscriber Identity Modules), within these networks. Such systems include, for example, cellular networks comprising phones wherein a subscriber is identified by a subscriber-specific subscriber identity module provided in the phones. The GSM (Global System for Mobile Communications) system represents one example of such a cellular communication system. Another example is the TETRA (Trans-European Trunked Radio) mobile communication system. The TETRA mobile communication system, in turn, represents an example of the PMR (Private Mobile Radio) mobile communication system. The present invention also relates to a method for checking the access right of a subscriber equipment in a mobile communication system.

BACKGROUND OF THE INVENTION

The subscriber identity module, such as a SIM card, is subscriber specific, which means that subscriber equipment, i.e., the actual radio devices, are not confined to a specific subscriber. The subscriber identity module, such as a SIM card or a GSM card, is a functional card or a smart card which is placed in the mobile equipment and contains information required to identify a subscriber and to encrypt radio traffic. In this application, a subscriber identity module, such as a SIM card, refers to a functional card that can be removed from a mobile equipment and by means of which a subscriber is able to use a card controlled mobile equipment.

Consequently, the user does not need a mobile equipment of his own, only a subscriber identity module issued to him by the operator of the mobile communication system. Such a subscriber identity module can be, for example, a SIM card (Subscriber Identity Module), which is, in a way, a phone card by means of which the subscriber can make (and receive) calls from any mobile equipment of the system.

As the subscriber identity module, a smart card can be used which has approximately the same dimensions as most credit cards. An alternative implementation of a SIM card in hand-held phones is a plug-in-SIM. A plug-in-SIM is a coin-sized part containing the electronics of a credit card sized SIM card and is placed in a phone so that the user is not able to replace it with ease. The phone may also have an incorporated plug-in-SIM and a card reader. If the card reader contains a card, the phone is identified based on the external card. Otherwise, the phone is identified based on the incorporated plug-in-SIM. In this application, the term subscriber identity module, such as a SIM card, refers to both the plug-in-SIM and the smart card SIM.

On a general level, the function of a SIM card is specified in the GSM recommendation 02.17, Subscriber Identity Modules, ETSI, of the GSM mobile communication system. It defines the terms associated with a SIM card, sets the requirements for the security of a SIM card, sets the functions of the highest level, and defines the tasks for the network operator and the information to be stored in a SIM card. It also specifies the minimum requirements for a SIM card of a user interface of a phone, such as a mobile equipment, concerning, for example, the input and change of a user's Personal Identification Number (PIN).

In addition, the GSM recommendation 11.11, SIM Application Protocol, ETSI, defines more specifically the issues specified by the aforementioned GSM recommendation 02.17 by defining the protocols between a SIM card and a mobile equipment (ME =Mobile Equipment), the contents and length of the data fields of the SIM card, and matters related to mechanical and electrical connections. The GSM recommendation 11.11 is a documentation based on which engineers are expected to be able to provide the software and hardware implementation of a SIM interface.

As far as mobile communication systems are concerned, it is known that the mobile subscriber has an identity by means of which the subscriber equipment can be identified, and which indicates, for example, the manufacturer of the subscriber equipment. Mobile communication networks have a facility by which the equipment identity of the subscriber, in the GSM system, the subscriber MEI, i.e., International Mobile Equipment Identity, is checked by requesting the equipment identity from the user. The equipment identity of the subscriber is checked, for example, when it is to be ensured that the subscriber equipment may be used in the network without it causing interference therein, i.e., that the particular equipment is not stolen or indicated as faulty. The detailed structure of a subscriber equipment identity in connection with the GSM system is described in the GSM standard 03.03, Numbering, Addressing and Identification, version 3.5.0, January 1991, ETSI. The subscriber equipment identity can typically be requested from the subscriber for example whenever the subscriber equipment has established a connection with the mobile telephone exchange. One manner of requesting the subscriber equipment identity of the subscriber is described in the GSM standard 09.02, Mobile Application Part Specification version 3.8.0, January 1991, ETSI, item 5.9.1, FIG. 5.9.1. GSM standard 09.02, item 5.9.1 also describes how the subscriber equipment identity is then transmitted to the equipment identity register (EIR) that checks whether the subscriber equipment concerned has the right to use the services of the mobile communication system, i.e., the register checks the access right of the subscriber equipment. The connection from the EIR to the mobile telephone exchange via an F interface is described in item 5.1 of GSM standard 09.02, especially in FIG. 5. 1.1.

The EIR or some other part of the mobile telephone network has lists according to, for example, the GSM standard 02.16 (International MS Equipment Identities version 3.0.1, 1992, ETSI). The lists contain subscriber equipment identities or series of subscriber equipment identities and have list identifiers. The standard uses colors that naturally signify, for example, numerical identifiers, as list identifiers. White or a white identifier is the list identifier of the list consisting of all numerical series containing the equipment identities that have been allocated by the operators using the same mobile telephone system, i.e., in this case, the GSM system, to the subscriber equipments that can be used in the networks concerned. These numerical series are set forth by only indicating the first and last numbers of the series, i.e. not by listing the identities of individual subscriber equipments. A list marked with black or a black list identifier contains the identities of all the subscriber equipments that must be denied access to the mobile network or to the mobile equipment, for example, because the subscriber equipment concerned is faulty and might cause interference in the mobile system itself or because the equipment has been stolen.

When the use of a subscriber equipment is to be prevented in the mobile network or when, for example, a disabling signal is to be transmitted to a subscriber equipment, the access right of the subscriber equipment must be checked, for example, in the above-described manner. A typical situation requiring prevention of use of a subscriber equipment or disabling of the equipment occurs when the subscriber or terminal equipment has been stolen and its use is to be prevented. In such a case, a disabling message must be transmitted to the unauthorized subscriber equipment or the equipment must be rendered inoperative in some other manner.

As described above, it is known in the GSM mobile system that the mobile network checks the access right of a subscriber equipment by randomly requesting the identity data of the subscriber equipment from the equipment and by examining from its own equipment identity register (EIR) by means of the data whether the use of the subscriber equipment concerned is allowed in the network. However, the equipment identity of a subscriber equipment is not necessarily requested, nor is the aforementioned checking performed in connection with each registration. Therefore, there may be long periods during which the access right of the subscriber equipment is not checked. On the other hand, it is possible in the GSM system to request the identity of the subscriber equipment, and thus, to check the access right of the equipment randomly, at random intervals.

If the checks are random, the checks load the radio path, the equipments on the path, and the data links between the exchange concerned and the equipment database, even though there were no reason to suspect that the equipment of the subscriber is on the black list of the EIR.

Random checkings do not prevent the use of a stolen equipment, if is no checking. This problem can be fixed by performing checks more often, but this in turn loads the connections and equipments even more.

Another alternative for checking the access right of a subscriber equipment is to perform the checking by means of the subscriber equipment identity in the EIR in connection with each registration.

Such transmission of the equipment data and the checking of the data in the EIR performed in connection with each registration loads the equipment and the system considerably, as this takes up a lot of system internal data transmission capacity, and a lot of processing capacity in the equipment identity register itself.

SUMMARY OF THE INVENTION

The purpose of the present invention is to solve the problems related to the prior art solutions. The object of the invention is to implement a method and a mobile communication system by means of which the checking of the access right of a subscriber equipment can be started at a necessary instant so that it can be ensured that the subscriber equipment using the mobile network have the right to use the network so that the telecommunication equipment and the subscriber equipment register of the mobile network are not overloaded.

It is an object of the present invention to implement this new method and mobile communication system to be as efficient and reliable as possible.

The present invention provides a method for checking the access right of a subscriber equipment in a mobile communication system that includes a network infrastructure containing a subscriber database, and a plurality of mobile equipment, each mobile equipment is a combination of a subscriber equipment provided with an equipment identity and a unique subscriber identity module which contains a subscriber identity and is detachably coupled to the subscriber equipment, whereby the mobile equipment can be activated by connecting the subscriber identity module to any subscriber equipment, the method including transmitting from the mobile equipment to the network infrastructure the subscriber identity contained in the subscriber identity module of the mobile equipment, and transmitting from the mobile equipment to the network infrastructure the subscriber equipment identity of the mobile equipment.

This method for checking the access right of the subscriber equipment includes:

maintaining, at the home database of the network infrastructure, subscriber-specific information on subscriber equipment identities permitted to be associated with the subscriber identity, comparing the subscriber equipment identity, transmitted by the mobile equipment to the network infrastructure, to the equipment identities permitted to be associated with the subscriber identity, these being stored in the home database, and if the equipment identity transmitted by said mobile equipment can be found among those equipment identities permitted to be associated with the subscriber identity, the operation of the mobile equipment continues in the normal manner, and if the equipment identity transmitted by said mobile equipment cannot be found among those equipment identities permitted to be associated with the subscriber identity, the access right of the subscriber equipment will be checked in the equipment identity register of the network infrastructure.

The invention also provides to a mobile communication system comprising a network infrastructure containing a home database and an equipment identity register, a plurality of mobile equipment each mobile equipment is a combination of a subscriber equipment provided with an equipment identity and a unique subscriber identity module which is detachably coupled to the subscriber equipment, whereby the mobile equipment can be realized by connecting the subscriber identity module to any subscriber equipment.

The home database of the mobile communication network maintains subscriber-specific information on subscriber equipment identities permitted to be associated with the subscriber identity The method includes maintaining, at the home database of the network infrastructure, subscriber-specific information on subscriber equipment identities permitted to be associated with the subscriber identity; and comparing the subscriber equipment identity, transmitted by the mobile equipment to the network infrastructure, to the equipment identities permitted to be associated with the subscriber identity stored in the home database. For this purpose, the identity is stored in the subscriber data of the subscriber database, i.e., subscriber equipment identity (IMEI), of the terminal equipment last used by the subscriber in question. When the mobile equipment is next registered in the network infrastructure, the subscriber is, in conjunction with the registration, asked for the identity of the subscriber equipment he is using. As soon as the network infrastructure has obtained the subscriber equipment identity associated with the new registration, it is compared to the subscriber equipment identity stored earlier in the network infrastructure. Based on this comparison, if the subscriber equipment identities match, the network infrastructure finds out that the mobile equipment involves the same subscriber equipment and subscriber identity module as the last time. As a result, normal-registration of the mobile equipment to the network infrastructure is initiated. If, on the other hand, the subscriber equipment identities differ, the network infrastructure determining that the mobile equipment involves a different subscriber equipment and subscriber identity module than the last time. As a result, the access right of the mobile equipment will be checked in the network infrastructure, for example, by carrying out an inquiry to the equipment identity register (EIR). Therefore, the system is able to carry out procedures necessary for preventing the use of unauthorized equipment within the system. After completion of the checking, and after determining that the subscriber data of the "new" subscriber does not contain an indication ordering the subscriber equipment to be disabled from the system or otherwise restricting the operation of the subscriber equipment, the identity data of the new subscriber is stored in the subscriber data and, consequently, the registration of the subscriber and the subscriber equipment to the system continues normally.

The method and mobile communication system according to the invention operate so that the system compares, as the subscriber is registering into the system, the identity data, i.e., the mobile equipment identity, IMEI, being transmitted by the subscriber equipment, to the identity data in the subscriber data of the system memory. If, based on the identity data, the system finds out that a different equipment is being used from the subscriber connection than the last time, the system carries out the necessary procedures to check the access right of the equipment, and based on the results of these procedures, takes necessary measures, for example, disables the mobile equipment from the mobile communication system.

Thus, in a mobile communication system which does not restrict the subscriber to a specific terminal equipment, the identity of the terminal equipment last used by the subscriber (i.e., the subscriber equipment identity) is stored in the subscriber data within the subscriber data register of the system. When the subscriber next registers in the network, or the checking is carried out, for example, randomly, and if it is determined that the equipment of the subscriber connection is not the same, measures are taken by which the use of unauthorized equipment will be prevented. It should be noted that in the subscriber data it is possible to store several subscriber equipment identities as "allowed" or "permitted to be associated with" previous equipment identities. This makes it unnecessary to check the identity of the subscriber equipment in the equipment identity register (EIR), even if the situation concerns some other subscriber equipment than the one that the subscriber last used, if the identity of the subscriber equipment can be found among the "allowed" equipment identities that have been programmed as "allowed" without checking the subscriber equipment identity.

The advantage of such an arrangement according to the present invention is that the subscriber equipment identity is not transmitted and checked randomly, nor is the checking performed too often, thus avoiding overload to the system resources. The system checks the data only when there is a real reason to suspect that the equipment is not used by an authorized user, for example. The load on the exchange, terminal equipment, radio link, equipment database and data links is decreased and the operation is faster, but a high level of security is maintained.

The present invention increases security also because a subscriber will not be able to avoid checks by luck when using an illegal equipment since the access rights of subscriber equipment are checked, particularly in situations where it is likely that the subscriber equipment is not used by an authorized user.

Further, the arrangement according to the present invention provides faster detection of unauthorized equipment in the system compared to random checks. For example, in different networks used by the authorities, this is very important, since there are very high requirements for information security. The use of stolen equipment must be detected immediately after the theft has occurred, and an unauthorized user must not be able to use the radio for a long time. Unauthorized use can be minimized with the present invention.

The present invention also provides the advantage that the use of an equipment and a subscriber connection can be prevented after a theft or a disappearance, but nevertheless it is not necessary to check the equipment data in the equipment identity register (EIR) in the majority of equipment registration.

If an unauthorized holder of an equipment uses the preceding subscriber identification module, for example, a SIM card, in the equipment, the use of the equipment and the subscriber connection can be prevented, if it is known that this subscriber equipment or interface should be disabled, whereupon the identity thereof can be set on the black list of the system. In such a case, when the data of this subscriber is checked, the equipment identity and possibly the location in the network can be seen from the subscriber data, whereupon the network can force the subscriber equipment to shutdown. The subscriber data may also be supplemented with information causing the closing of the equipment during the next registration. The checking and identification of subscriber data from the mobile system registers and the possible prevention of the use of the equipment, based merely on equipment data, are thus necessary only in cases where an equipment that is in unauthorized use is not used with the same subscriber identification module, for example, a SIM card, as previously.

The advantages of the invention become evident for example in a situation where a subscriber equipment has been stolen and the new user uses the equipment with another SIM card. If the thief uses the equipment with a new SIM card, the use of the equipment and the subscriber connection can be prevented based on the SIM card, since the checking is activated because the home database stores a different equipment identity than the identity of the equipment used.

BRIEF DESCRIPTION OF THE DRAWINGS

In the following, the invention will be described with reference to the attached drawings, in which.

DETAILED DESCRIPTION OF THE CURRENTLY PREFERRED EMBODIMENTS

According to the method of the invention, checking the -access right of the subscriber equipment in the equipment identity register (EIR) can be restricted to situations in which the subscriber equipment identity has not been stored in the home database in advance.

Figure 1:
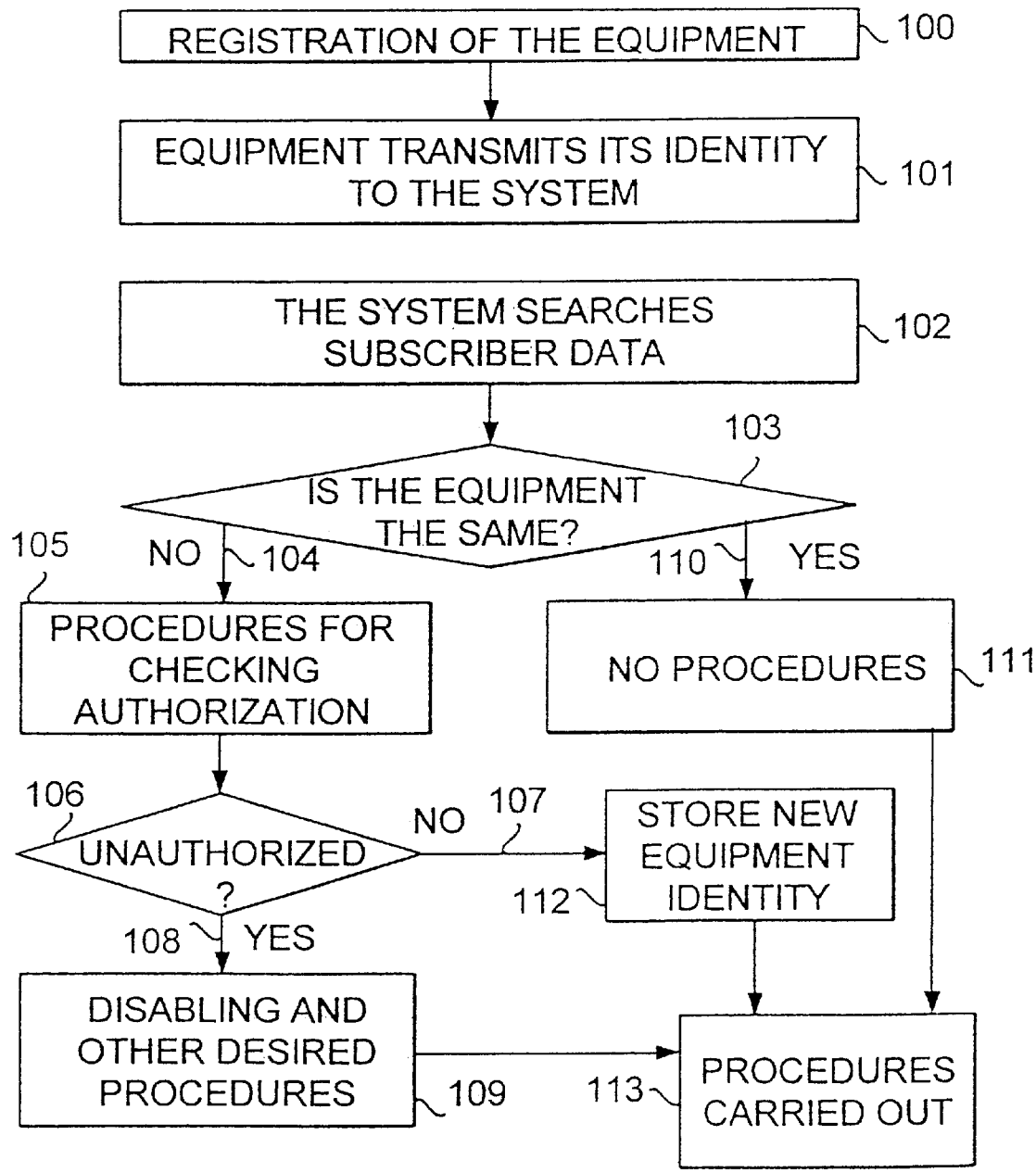
FIG. 1 is a flow chart illustrating the operation of a first embodiment of the method and mobile communication system of the invention.

FIG. 1 is a flow chart illustrating the operation of first embodiment of the method and mobile communication system according to the invention.

In the solution of the invention, in the subscriber data of the cellular network, the identity data of the terminal equipment that was last used by the subscriber in question is stored. In case the subscriber uses a different terminal equipment than the last time, the system can carry out desired procedures. For example, procedures 105 can be activated in order to check the identity of the equipment, or the equipment can be included on a separate list of equipment under supervision.

The equipment must have a specific identity data which can be stored in the subscriber data. This equipment identity data must be sent from the equipment to the system in connection with the subscriber registration. In the GSM system, the equipment identity data in question is IMEI.

In the following, the operation of the invention is described by means of the flow chart of FIG. 1. As a subscriber registers 100 in the mobile communication system, the system acquires the subscriber data and checks whether the subscriber in question is entitled to the services of the system. At the same time, the mobile equipment, and particularly its subscriber equipment, also transmits 101 its equipment identity to the mobile communication system. Transmitting the equipment identity can take place automatically every time the mobile equipment registers in the system, or the mobile communication system can request the mobile equipment identity (IMEI) from the mobile equipment by a specific message. Consequently, the mobile equipment responds to the request by transmitting 101 its subscriber equipment identity to the mobile communication system. Thereafter, the system searches 102 the subscriber data from the database. Following this, the method of the invention proceeds to an analysis or comparison stage 103, at which the equipment identity of the mobile equipment stored at an earlier stage in the database is compared to the equipment identity transmitted by the mobile equipment in association with this registration. If, according to the invention, it is detected that the subscriber equipment has changed 104 compared to the one in the subscriber data, measures 105 are taken in order to check the access right of the subscriber equipment. A multitude of methods are available for checking the access right of the equipment after finding out that the equipment is not the same 104 as the one previously used by the subscriber. The method to be applied may depend on the type of a system in question and how the subscribers in it usually act. The procedures to be taken include transmitting a checking request to the equipment identity register (EIR) or a similar database, such as a list of stolen equipments. Alternatively, the checking request can be repeated at predetermined intervals for a specific time, or the subscriber and the equipment can be included on a list of devices under supervision, whereupon their entitlement to use the network is checked at predetermined intervals or randomly during the predetermined time. In connection with the change, time data can be included therein, whereby the aforementioned request can be repeated at predetermined intervals for a predetermined period of time. This makes it possible to ensure that information on the displacement or stealing of the equipment has reached the list of unauthorized equipment.

As a result, if a subscriber equipment in the mobile equipment is found to be unauthorized 108 based on the comparison 106, it is possible to activate procedures of the network itself in order to disable 109 the subscriber equipment and the subscriber in question from the network. An effort can be made to disable the subscriber and the subscriber equipment, or their data can be stored in a register of susceptible subscribers or subscriber equipments, whereby their rights, for example, speech rights in the network, can be restricted.

Information on a new equipment—subscriber combination can also be transmitted 109 to a separate list which stores the information for a specific time. The contents of this list may be checked every time a new equipment is added on the list of unauthorized equipment.

The system may also contain a list of equipment known to pass to a new subscriber legally. The change data can be compared to the list, and further procedures will be unnecessary if the new equipment of the subscriber is found on the list. The list can be maintained by the operator, or by transmitting a message from the former owner of the equipment. If such messages are to be transmitted, it must be carried out by using a secret personal identification number in order for an unauthorized holder to be unable to send it.

If, based on various comparisons 106, it is determined that the subscriber equipment in question is not unauthorized 107, the identity (IMEI) of that equipment which has been attached to the subscriber and which together with the subscriber (i.e., the subscriber identity module, such as a SIM card) forms a mobile equipment is stored 112 in the subscriber database of the mobile communication system. The stored identity of the new subscriber equipment will then be employed in a similar comparison when the mobile equipment next registers in the mobile communication system in question.

If, on the other hand, it is determined based on the aforementioned comparison 103 that the equipment used in connection with the subscriber is the same 110 as previously, no procedures are carried out, and the operation of the mobile equipment and the mobile communication system continues normally.

In all the preceding cases after steps 109, 111 and 112, upon completion of all the procedures off the invention, the process continues in accordance with normal operation of a mobile communication system.

Figure 2:
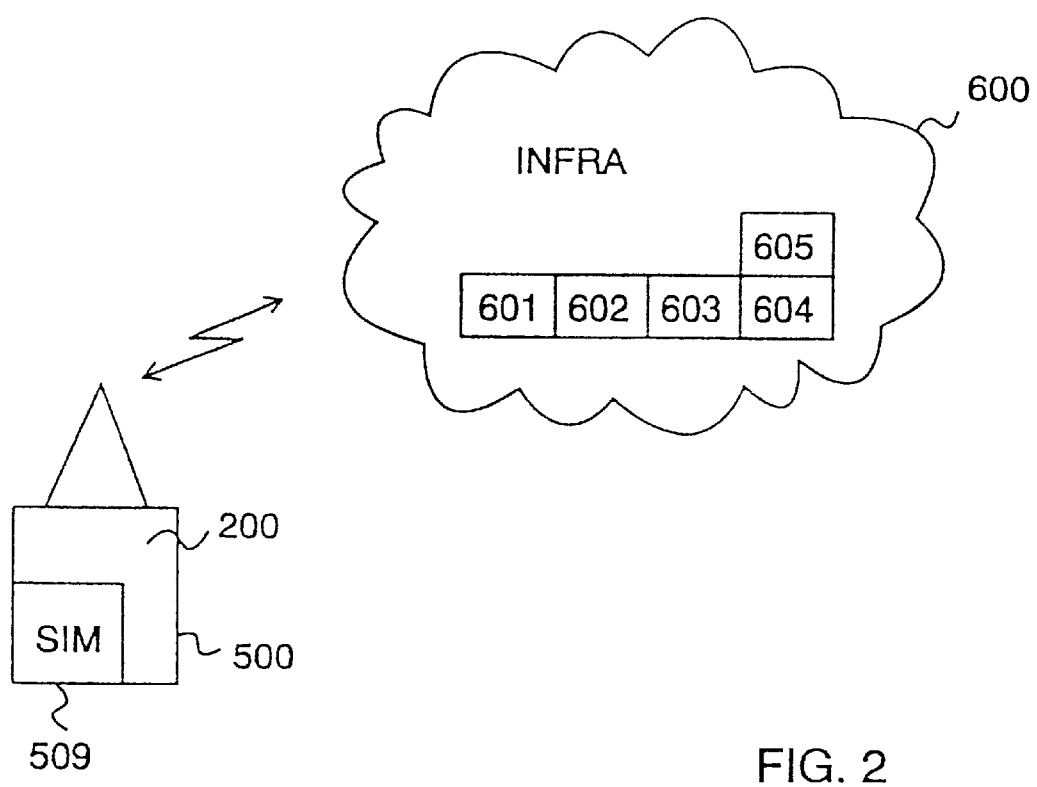
FIG. 2 is a block diagram illustration of the mobile communication system according to the invention.

FIG. 2 is a block diagram illustrating the mobile communication system according to the present invention. FIG. 2 shows a mobile communication system comprising a network infrastructure 600 containing a subscriber database 601, and a plurality of mobile equipment 500, each mobile equipment is a combination of a subscriber equipment 200 provided with an equipment identity and a unique subscriber identity module 509, such as a SIM card. The subscriber identity module 509 is detachably coupled to the subscriber equipment 200, whereby the mobile equipment 500 can be activated by connecting the subscriber identity module 509 to any subscriber equipment 200.

The mobile communication system of the invention comprises a comparator 602 for comparing 103 (FIG. 1) the subscriber's mobile equipment identity (MEI), stored in the subscriber database 601, to the equipment identity transmitted 101 (FIG. 1) by the mobile equipment 500. Based on this comparison 103, if the equipment identities are identical 110 (FIG. 1), the mobile equipment is allowed to continue normal operation 111. If the equipment identities are different 104, the access right of the mobile equipment will be checked 105 in the equipment identity register EIR of the network infrastructure.

The subscriber database 601 referred to in the above may be, for example, a home location register (HLR) of the GSM mobile communication system.

The mobile communication system of the invention further comprises a database 603, to which, according to the second checking alternative 105, the identity of the subscriber equipment 200 and the subscriber identity, which is obtained from the subscriber identity module 509, are stored 112 for a predetermined period of time.

Furthermore, the mobile communication system of the invention comprises an access right check 604 for checking 107 the access right of the subscriber equipment at predetermined intervals in the network infrastructure 600 in response to the database entry.

In addition, the mobile communication system according to the invention comprises a database 605 which stores the identities of those subscriber equipments 200 that have legally passed to a new owner.

The figures and the description related thereto are only intended to illustrate the idea of the invention. The method according to the invention for checking the access right of a subscriber equipment in a mobile communication system may vary in details within the scope of the claims. Although the invention is in the above described mainly in connection with the GSM and TETRA mobile communication systems, the invention is applicable to further developments thereof and in other types of mobile communication systems.

The solutions according to the invention do not deal with on how the equipment data is checked from the subscriber equipment register of the network. According to the solutions in accordance with the invention, the mobile communication system of the invention, for example the exchange to which the subscriber in question is registered, initiates checkings regarding the access right of the subscriber equipment in suspicious cases, i.e. when the subscriber tries to employ the mobile communication system from such a subscriber equipment whose equipment identity cannot be found among those equipment identities stored in the home database that are permitted to be associated with the subscriber identity.

I claim:

1. A method for checking an access right of a subscriber equipment in a mobile communication system including a network infrastructure containing a home database and an equipment identity register, and a plurality of mobile equipment, each said mobile equipment being a combination of a subscriber equipment provided with an equipment identity and a unique subscriber identity module, which contains a subscriber identity and which is detachably coupled to said subscriber equipment, whereby said mobile equipment is activated by connecting said subscriber identity module to any of said subscriber equipment, said method comprising:

transmitting, from said mobile equipment to said network infrastructure, said subscriber identity contained in said subscriber identity module of said mobile equipment;

transmitting, from said mobile equipment to said network infrastructure, said subscriber equipment identity of said mobile equipment;

maintaining, at said home database of said network infrastructure, subscriber-specific information on subscriber equipment identities permitted to be associated with said subscriber identity;

comparing said mobile subscriber equipment identity transmitted by said mobile equipment to said network infrastructure to said equipment identities permitted to be associated with said subscriber identity stored in said home database;

if said equipment identity transmitted by said mobile equipment is found among said equipment identities permitted to be associated with said subscriber identity, said operation of said mobile equipment continues in a normal manner; and if the equipment identity transmitted by said mobile equipment is not found among said equipment identities permitted to be associated with said subscriber identity, said access right of said subscriber equipment is checked in said equipment identity register of said network infrastructure.

2. The method as claimed in claim 1, wherein if checking into said equipment identity register results in said subscriber equipment having said access right to said network infrastructure, the identity of said subscriber equipment is stored in said home database of said network infrastructure among said equipment identities permitted to be associated with said subscriber identity, and operation of said mobile equipment continues normally.

3. The method as claimed in claim 1, wherein, if checking into said equipment identity register results in said subscriber equipment having no access right to said network infrastructure, said mobile equipment is disabled.

4. The method as claimed in claim 1, wherein said access right of said subscriber equipment is checked at predetermined intervals.

5. The method as claimed in claim 1, wherein, if said equipment identity transmitted by said mobile equipment is not found among said equipment identities permitted to be associated with said subscriber identity, said subscriber equipment identity and said subscriber identity are stored for a predetermined time in a database within said network infrastructure, and said access right of said subscriber equipment is checked in said equipment identity register of said network infrastructure at predetermined intervals in response to said database entry.

6. The method as claimed in claim 1, wherein, if said equipment identity transmitted by said mobile equipment is not found among equipment identities permitted to be associated with said subscriber identity, said access right of said subscriber equipment is checked based on said subscriber equipment identity in said database which includes identities of subscriber equipments that have legally passed to a new owner.

7. A mobile communication system, comprising:

a network infrastructure including a home database and an equipment identity register;

a plurality of mobile equipment, each said mobile equipment being a combination of a subscriber equipment provided with an equipment identity and a unique subscriber identity module, which is detachably coupled to said subscriber equipment, whereby said mobile equipment is activated by connecting said subscriber identity module to any of said subscriber equipment, and a comparator which compares said subscriber equipment identity transmitted by said mobile equipment to said network infrastructure to said subscriber equipment identities maintained in said home database that are permitted to be associated with said subscriber identity, wherein a home database of said mobile communication network is arranged to maintain subscriber-specific information on subscriber equipment identities permitted to be associated with said subscriber identity, wherein said comparator permits operation of said mobile equipment to continue normally, if said equipment identity transmitted by said mobile equipment is found among said equipment identities permitted to be associated with said subscriber identity, and wherein said comparator checks said access right of said subscriber equipment in said equipment identity register of said network infrastructure, if said equipment identity transmitted by said mobile equipment is not found among said equipment identities permitted to be associated with said subscriber identity.

8. The mobile communication system as claimed in claim 7, further comprising:

a checker which checks said access right of said subscriber equipment in said network infrastructure at predetermined intervals.

9. The mobile communication system as claimed in claim 7, further comprising:

a database which includes identities of said subscriber equipment that have legally passed to new owners.

* * * * *